United States Patent
Schmidt et al.

(10) Patent No.: US 9,117,251 B2
(45) Date of Patent: Aug. 25, 2015

(54) SYSTEMS AND METHODS FOR PLUG LOAD CONTROL AND MANAGEMENT

(71) Applicants: Jameslevi Schmidt, New York, NY (US); Jun Shimada, New York, NY (US); Mei Shibata, New York, NY (US); Ben Hertz-Shargel, Roslyn Estates, NY (US)

(72) Inventors: Jameslevi Schmidt, New York, NY (US); Jun Shimada, New York, NY (US); Mei Shibata, New York, NY (US); Ben Hertz-Shargel, Roslyn Estates, NY (US)

(73) Assignee: ThinkEco, Inc., New York, NY (US)

( * ) Notice: Subject to any disclaimer, the term of this patent is extended or adjusted under 35 U.S.C. 154(b) by 343 days.

(21) Appl. No.: 13/718,872

(22) Filed: Dec. 18, 2012

(65) Prior Publication Data

US 2014/0172184 A1    Jun. 19, 2014

(51) Int. Cl.
*G06F 19/00* (2011.01)
*G06Q 50/06* (2012.01)
*G05B 15/02* (2006.01)

(52) U.S. Cl.
CPC ............. *G06Q 50/06* (2013.01); *G05B 15/02* (2013.01)

(58) Field of Classification Search
USPC .................. 700/276, 291, 295, 415
See application file for complete search history.

(56) References Cited

U.S. PATENT DOCUMENTS

| | | | |
|---|---|---|---|
| 4,644,320 A * | 2/1987 | Carr et al. | 340/12.37 |
| 6,735,705 B1 * | 5/2004 | Egbert et al. | 713/300 |
| 7,834,479 B2 * | 11/2010 | Capp et al. | 307/21 |
| 7,973,425 B2 * | 7/2011 | Chen | 307/12 |
| 8,140,279 B2 | 3/2012 | Subbloie | |
| 8,156,055 B2 | 4/2012 | Shimada et al. | |
| 2010/0070217 A1 | 3/2010 | Shimada et al. | |
| 2010/0145542 A1 * | 6/2010 | Chapel et al. | 700/295 |
| 2010/0280978 A1 | 11/2010 | Shimada et al. | |
| 2011/0106328 A1 * | 5/2011 | Zhou et al. | 700/291 |
| 2011/0202196 A1 | 8/2011 | Venkatakrishnan et al. | |
| 2012/0078432 A1 | 3/2012 | Weatherhead et al. | |
| 2012/0221718 A1 | 8/2012 | Imes et al. | |

OTHER PUBLICATIONS

Weng et al., Managing Plug-Loads for Demand Response within Building, Nov. 2011, Department od computer Science and engineering, UC San Diego , p. 1-6.*
International Search Report and Written Opinion, International Searching Authority, dated May 23, 2014, PCT/US13/75262.

* cited by examiner

*Primary Examiner* — Kidest Bahta
(74) *Attorney, Agent, or Firm* — Dorf & Nelson LLP; Scott D. Locke, Esq.

(57) ABSTRACT

The present invention is directed to methods and systems for control of loads that are connected to plugs. Through the use of various embodiments of the present invention one may allow a plurality of users to control the use of power by individual loads and dynamically configurable sets of loads with ease, on both small and large scales. Users may select from energy savings plans to generate compiled device power state schedules that automatically cause devices to enter power savings modes as pre-determined times. Consequently, one can efficiently manage plug load electricity usage in a plurality of buildings.

20 Claims, 3 Drawing Sheets

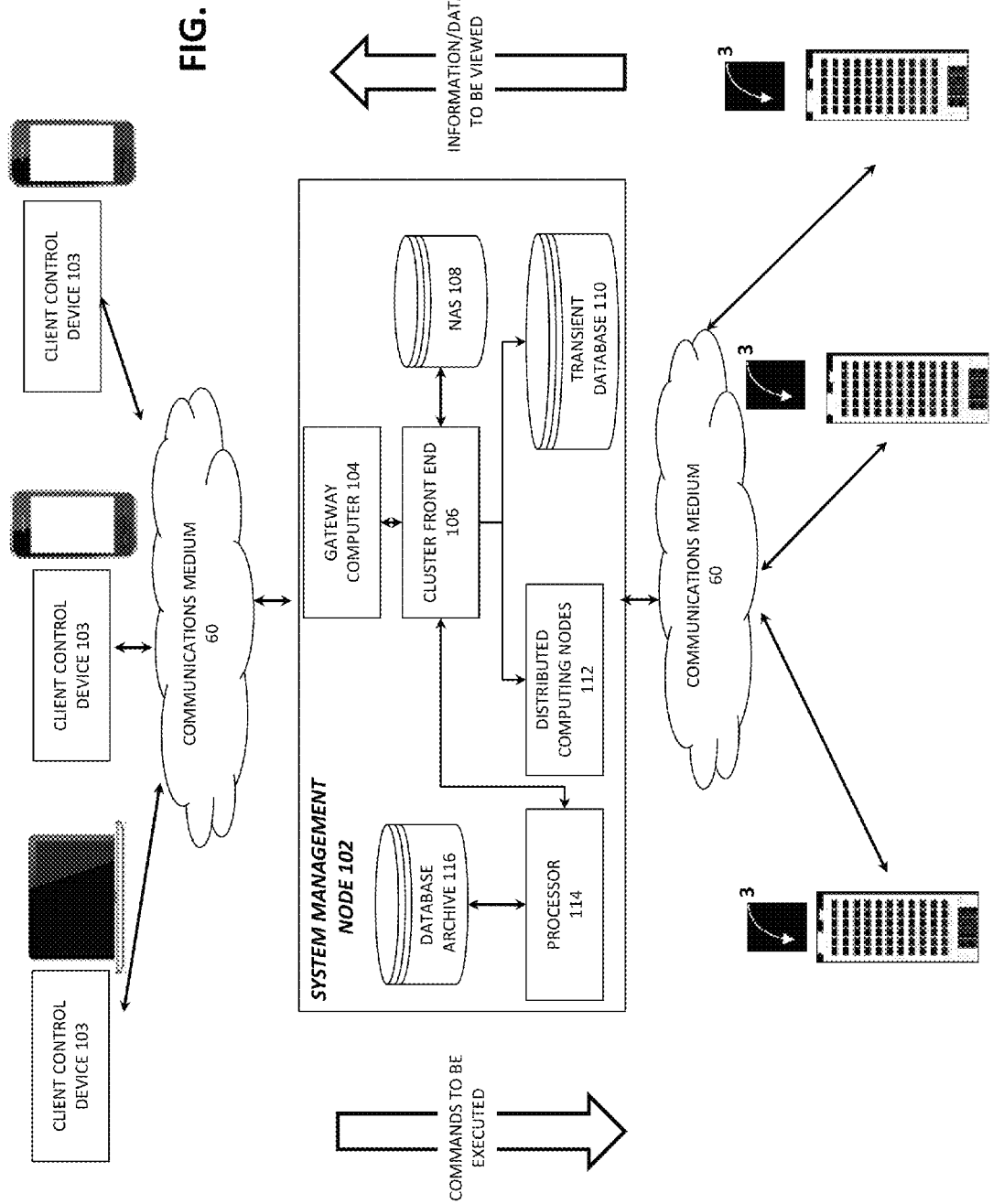

SYSTEMS AND METHODS FOR PLUG LOAD CONTROL AND MANAGEMENT

FIELD OF THE INVENTION

The present invention relates to the control of plug load devices.

BACKGROUND OF THE INVENTION

Global energy consumption steadily outpaces the growth of economically viable renewable energy, and the amount of available fossil fuel resources continues to dwindle. Consequently, energy efficiency remains an important initiative. By improving efficiency, the global community can reduce energy consumption, and thereby conserve resources for the future without decreasing quality of life in the present.

One movement toward improving energy efficiency is to use electronic devices, such as sensors and microcontrollers in order to create intelligent, computerized networks to control and to monitor certain energy consuming features of buildings. Over the past decade, such systems, called building automation systems (BAS), have significantly improved the efficiency of certain energy end-use categories such as heating, ventilation and air conditioning (HVAC) and lighting, especially in commercial buildings. In fact, as the U.S. Energy Information Administration (EIA) has noted, the electricity consumption by HVAC and lighting per square foot of commercial floor space has been decreasing. Unfortunately, the category of plug loads (which refers to devices that plug into wall sockets and demand electricity) has proven more difficult to control and to manage, and thus it remains largely unaddressed.

Demonstrative of the challenges of improving the efficiency of plug loads is the trend that they, plug loads, outpace growth in commercial floor space to such a degree that the overall energy consumption of commercial buildings is still climbing. Currently, plug loads account for more than 20% of electricity usage in commercial buildings and are the fastest growing end-use category of electricity in the commercial sector. (U.S. Department of Energy, "Annual Energy Outlook 2012 Early Release," 2012.) Similarly, in the residential setting, energy usage from HVAC and lighting is decreasing while energy usage from plug loads such as televisions, set top boxes, computers and other plugged in devices is growing. Experts project that this usage will continue to grow.

Recently, outlet control and monitoring devices have been developed to begin to address plug load energy inefficiency by monitoring power consumption and using computer technology to turn off power supplies to plugged in devices remotely, when not in use. Examples of this technology are disclosed in U.S. Patent Publication No. 2010-0070217, which published on Mar. 18, 2010, and U.S. Patent Publication No. 2010-0280978, which published on Nov. 4, 2010. While these technologies extend certain types of control ability to the previously unaddressed category of plug loads, there remain barriers to the practical implementation of a plug load energy efficiency system that have largely prevented integration of plug load control into BAS.

SUMMARY OF THE INVENTION

The present invention provides systems, methods and computer program products for safely and conveniently controlling a plurality of plug load devices that may be found in a commercial or residential setting. One may control these devices, individually or as grouped by any number of criteria. By using outlet control and monitoring devices (OCMDs) according to various embodiments of the present invention, from one or a plurality of local or remote user controllers, one or more users may intelligently manage various user-generated or event-driven control signals including real-time power state control events, pre-programmed schedules and local and/or remote override triggers. The management may be based on the identity of the user or event of its origin, as well as pre-programmed operational rules, system configurations and user preferences.

According to a first embodiment, the present invention provides a method for generating a compiled device power state schedule, said method comprising: (a) accessing a computer database that stores a set of energy savings plans, wherein each energy savings plan comprises information corresponding to a plurality of planned on/off events over a major scheduling period of duration T1, wherein the major scheduling period is divided into a plurality of minor scheduling periods, wherein the number of minor scheduling periods is n and each minor scheduling period is of duration T2 and wherein $T1=n \times T2$; (b) associating one or more devices with a plurality of energy savings plans from said set of energy savings plans, wherein each energy savings plan has (i) a start date and an end date, and (ii) a priority value; and (c) applying a computer algorithm to the plurality of energy saving plans to generate an output, wherein the output comprises a compiled device power state schedule for a time period XY of duration T1 and the time period is divided into n minor scheduling periods, each of which has a duration T2, wherein the time period XY begins at X and ends at Y and for each minor scheduling period within XY the algorithm analyzes the plurality of energy savings plans to determine which energy savings plan that has a start date that is before or the same as the minor scheduling period within XY and an end date that is after or the same as the minor scheduling period within XY has the greatest priority for incorporation into the compiled device power state schedule. A compiled energy savings plan may be generated for each device or for each set of devices that are associated with the same plurality of energy savings plans during XY.

According to a second embodiment, the present invention provides a method for controlling the energy usage of one or more plug load devices comprising: (a) receiving electronic data comprising a first set of instructions, wherein the first set of instructions comprise (i) an identification of a plurality of energy savings plans, wherein each energy savings plan comprises information for a plurality of planned on/off events over a major scheduling period of duration T1, wherein the major scheduling period is divided into a plurality of minor scheduling periods, wherein the number of minor scheduling periods is n and each minor scheduling period is of duration T2 and wherein $T1=n \times T2$; (ii) a start date and an end date for each energy savings plan; (iii) a set of priority rules, wherein the priority rules define a relative order of priority among the plurality of energy savings plans that may be used to determine which planned on/off events from which energy savings plans to apply for each minor scheduling period; and (iv) a designation of one or more plug load devices for each energy savings plan; (b) generating a compiled device power state schedule, wherein the compiled device power state schedule comprises a second set of instructions for planned on/off events for a time period T1 to begin on date X and end on date Y, and said second set of instructions is derived from the plurality of energy savings plans according to the start date and the end date for each energy savings plan and the priority rules; (c) transmitting the compiled device power state schedule to a system controller; (d) causing the system controller to store the compiled device power state schedule and to transmit it to one or more outlet control and monitoring devices, wherein each of said one or more outlet control and monitoring devices is associated with one or more plug load devices; and (e) causing the one or more outlet control and monitoring devices to implement the compiled device power state schedule.

In this embodiment, the start and end date for each energy savings plan may be part of a data package that defines the energy savings plan or it may be a separate user generated data package. Similarly, the set of priority rules may be defined by information that is part of a data package that defines the energy savings plan or it may be a separate user generated data package.

According to a third embodiment, the present invention provides a system for controlling energy usage of a plug load device comprising: (a) a plug load device; (b) an outlet control and monitoring device, wherein the outlet control and monitoring device stores a compiled device power state schedule for a major scheduling period and is operably coupled to the plug load device; (c) a system controller, wherein the system controller is configured to communicate wirelessly with the outlet control and monitoring device; (d) a system management node, wherein the system management node is configured to communicate with the system controller and comprises or is operably coupled to (i) a first database that stores a plurality of energy savings plans, wherein each energy savings plan comprises information for a plurality of planned on/off events over a major scheduling period of duration T1, wherein the major scheduling period is divided into a plurality of minor scheduling periods, wherein the number of minor scheduling periods is n and each minor scheduling period is of duration T2 and wherein T1=n×T2; (ii) a communication module, wherein the communication module is configured to receive digital information comprising (1) a selection of a plurality of energy savings plans, wherein each energy savings plan is associated with a start date and an end date and a prioritization, and (2) a designation of at least one plug load device to which to apply each energy savings plan within the plurality of energy savings plans; (iii) a computer program product for generating a compiled device power state schedule, wherein the compiled device power state schedule is dependent on the selection of the energy savings plans, the start date and the end date for each energy savings plan within the plurality of energy savings plans and the prioritization of each energy savings plans within the plurality of energy savings plans (iv) a transmission module, wherein the transmission module is configured to transmit the compiled device power state schedule to the system controller and the system controller is configured to store the compiled device power state schedule and to transmit the compiled device power state schedule to the outlet control and management device or devices.

The methods and systems of the present invention enable intelligent control of plug load devices within commercial or residential settings and permit one to increase energy efficiency and cost savings without compromising safety, comfort or productivity based on one or more of user-generated or event-driven control signals. Within these systems, each outlet control and monitoring device may be associated with one or more corresponding home or office plug load devices (e.g., appliances) and have the ability to shut off power to each of its associated devices at certain periodic, predictable or unpredictable times or during certain periodic, predictable or unpredictable intervals based on control signals received from a system controller. Each OCMD may have onboard memory to execute real-time control signal events and to store historical and/or future scheduled control signal events, as well as device operating information. Thus, in some embodiments, one or more compiled device power state schedules are stored on the OCMD and the system controller transmits information to activate a certain compiled device power state schedule. In other embodiments, the system controller simultaneously transmits the compiled device power state schedule and optionally, an instruction of when to execute it.

The system controller may be configured to interpret and to process various user-generated or event-driven control signals, including but not limited to: (1) real-time switch events; (2) pre-programmed schedules assigned to one or more OCMDs for one or more date ranges; (3) local and/or remote override triggers, based on the identity and/or priority of the user or event of their origin; and (4) pre-programmed operational rules, system configurations and user preferences, to determine the best and most correct sequence of control signals to send each OCMD. Each system controller may comprises, consistent essentially of or consist of hardware, software or a combination of hardware and software that comprises one or more if not all of: (1) a communication module for sending and receiving device control signals and device energy data to and from one or more OCMDs; (2) a memory associated with the system controller for storing real-time, historical or future scheduled control signal events, user rules, priorities and identification information, specific information related to a plurality of individual OCMDs; and (3) corresponding electrical devices thereof, and various groupings thereof, and at least one processor for computing parameter values related to device operation information, device energy usage, device grouping criteria, operational rules, user identities, user priorities and user preferences. Notably, in some embodiments, the system controller stores compiled device power states schedules and transmits them to the OCMDs at or shortly before they need to be implemented by the OCMDs.

According to a fourth embodiment, the present invention provides a computer readable medium comprising at least one computer program code for enabling intelligent control of plug load devices within commercial or residential settings based on a plurality of user-generated or event-driven control signals. In some embodiments, the code is stored in a non-transitory medium and is capable of carrying out one or more methods of the present invention or being implemented by one or more systems of the present invention. By way of a non-limiting example, the computer program code may be configured to enable, to manage and to interpret various user-generated or event-driven control signals, including real-time switch events, pre-programmed schedules assigned to one or more OCMDs for one or more date ranges, and local and/or remote override triggers based on the identity and/or priority of the user or event of its origin and according to pre-programmed operational rules, system configurations and user preferences, to determine the best and most correct sequence of control signals to send each OCMD. The code, when executed, may cause the system controller to activate its communication module for sending and receiving device control signals and device energy data to and from one or more OCMDs. The code may also cause access of a memory associated with the system controller for storing real-time, historical or future scheduled control signal events, user roles, priorities and identification information, specific information related to a plurality of individual OCMDs and corresponding electrical devices thereof, and various groupings thereof, and at least one processor for computing parameter values related to device operation information, device energy usage, device grouping criteria, operational rules, user identities, user priorities and user preferences.

Some embodiments of the present invention may be configured to enable control of a plurality of plug loads by a plurality of users on a large scale. This may be done while maintaining safety, comfort, productivity and flexibility for a plurality of controls of users and administrators with different interests and different levels of visibility into the granularity of usage needs. Notably, different users may be granted different permissions, thereby being able to control different groups of devices. These groups may overlap or be non-overlapping.

Various embodiments of the present invention provide one or more of the advantages described below.

First, various embodiments of the present invention may be scalable, allowing for easy control on a large scale, so that a system administrator or facilities manager, for example, can quickly and seamlessly set energy savings plans for thousands of load devices, (coupled to corresponding OCMDs,) over multiple buildings, using a simple graphical user interface (GUI) and requiring minimal time and effort.

Second, various embodiments of the present invention may simultaneously be granular, allowing for large numbers, for example, thousands of individual users to have certain control permissions that allow them to override, automatically or manually, an administrator-set energy savings plan for some subset of devices (e.g., the devices at that user's desk). This allows users to easily avoid service interruptions, thereby allowing the control system to seamlessly blend into the individual user's daily routine, minimizing required behavioral change.

Third, various embodiments of the present invention may be highly flexible in terms of configuration, whereby essentially an unlimited number of permutations and combinations of control can be achieved and executed across numerous critical categories, or dimensions, of control. For example, a given system can have many different energy savings plans, each of which applies to many different devices on many different date ranges, and which are set by many different users, each user having many different scheduling, editing, override control and ownership permissions over many different devices.

Fourth, various embodiments of the present invention may allow for a plurality of levels of control with various associated levels of permissions, whereby a system can be configured to allow a "super administrator" to have access to control all plug load devices in a company's buildings, (e.g., 1-100 or 5-50 building), then each building can have a "building administrator" with control over each building's devices (e.g., 100-10,000 or 250-5,000 or 500-1000 devices), then each floor could have a "floor administrator" with control over each floor's (e.g., 20-200, 50-150 or 100-125 devices), then each group could have a "group administrator" with control over a group of cubicles (2-50 or 5-10 cubicles) each with a plurality of devices and finally, each cubicle could have a single "cubicle administrator" with control over his or her own cubicle's devices (e.g., 1-5 or 2-4 devices). The system may also be configurable to set a priority level for each of these control levels, so that immediate ability to control a device and to override a currently executing compiled device power state schedule is allowed (or permission for this ability can be requested) where it is required, and awareness of such event is automatically disseminated to the users at control levels that need to know it.

Fifth, various embodiments of the present invention may have extremely high reliability with respect to exercising control over OCMDs and their coupled devices.

Sixth, various embodiments of the present invention may be capable of operating in real-time or near real-time to provide immediate control over OCMDs and their coupled devices.

BRIEF DESCRIPTION OF THE DRAWINGS

FIG. 1B is a detailed illustration of a system management node of an embodiment of the invention.

DETAILED DESCRIPTION OF THE INVENTION

Figure 1A:
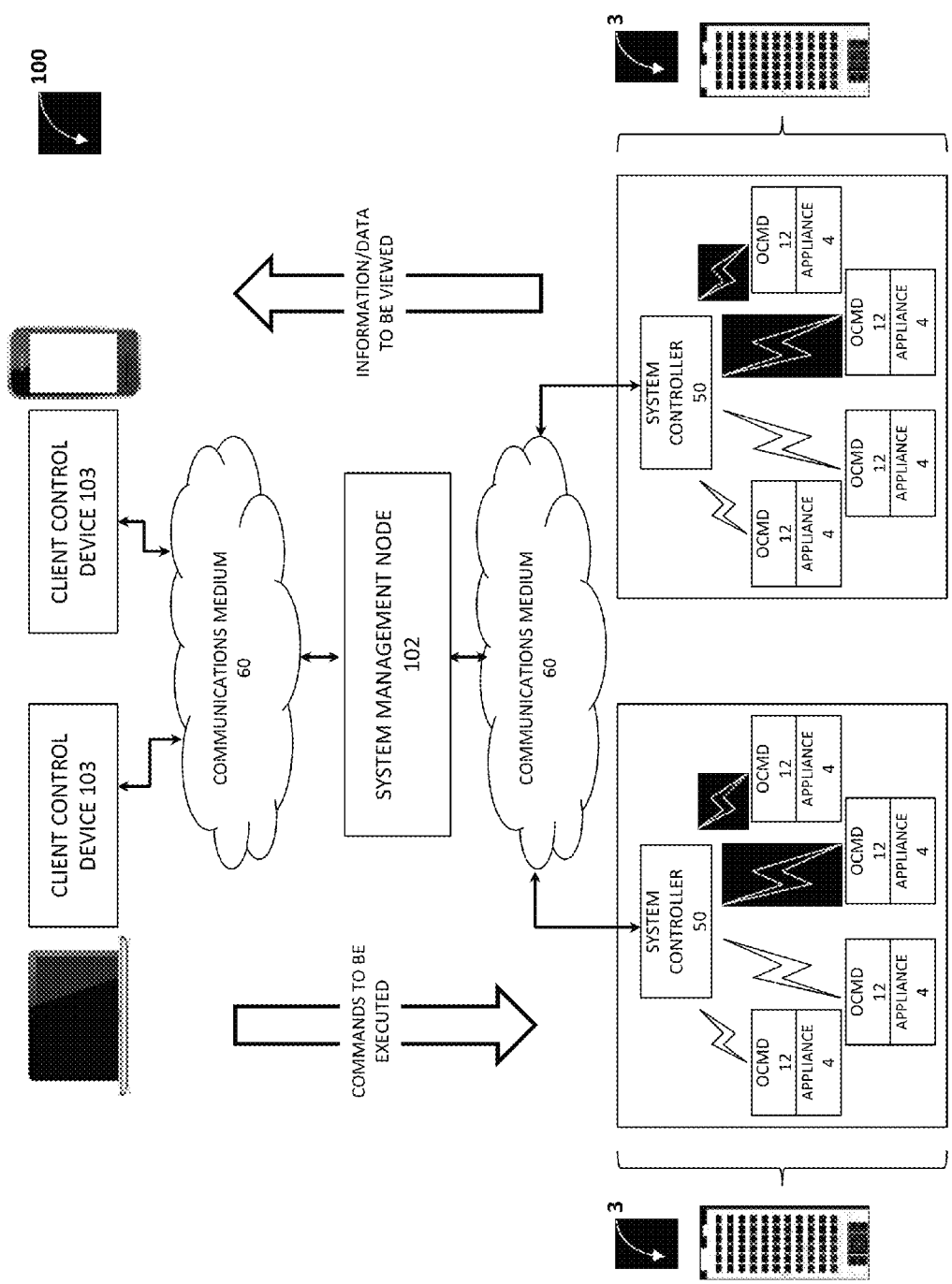
FIG. 1A is a diagram illustrating an architecture of a system for device power state control in accordance with one embodiment of the invention.

In the following discussion, numerous specific details are set forth in order to provide a thorough understanding of the present invention. Additionally, this specification provides examples and figures in order to illustrate various features. However, those skilled in the art will appreciate that various embodiments of the present invention may be practiced without one or more of the recited specific details. Additionally, within the figures, well-known elements have been illustrated in schematic or block diagram form in order not to obscure the present invention in unnecessary detail. Furthermore, details concerning network communications, electromagnetic signaling techniques and other well-known technologies have not been described in detail because they are well-known to persons of ordinary skill in the art, and recitation of such details is not considered necessary to obtain a complete understanding of the present invention.

All statements herein reciting principles, aspects, and embodiments of the disclosure, as well as specific examples thereof, are intended to encompass both structural and functional equivalents thereof. The inventors intend that such equivalents include both currently known equivalents as well as equivalents developed in the future, i.e., any elements developed that perform the same function or substantially the same function, regardless of structure.

Definitions

Unless otherwise specified or apparent from context, the following terms and phrases have the meanings provided below.

The phrase "compiled device power state schedule" as used herein refers to the set of planned on/off event for a scheduling period that has been created according to various embodiments of the present invention. The compiled device power state schedule is the schedule that is ultimately supplied to the OCMD for execution, and it may be applied to one or more OCMDs. It may, for example, refer to the planned on/off events of one single minor scheduling period (e.g., of one day) belonging to a certain savings plan that has been applied to a certain device on a given minor scheduling period (e.g., on a given day), and thus may be referred to as a "compiled daily device power state schedule." Similarly, the compiled device power state schedule may refer to the planned on/off events of each minor scheduling period that together comprise one single major scheduling period (e.g., of one week) and thus may for example be a "compiled weekly device power state schedule."

The phrase "device control event" as used herein refers to a command to turn on or off a device that uses energy, e.g., electricity, or change in definition of a currently executing or future weekly schedule, directed to one or more OCMDs and associated devices.

The phrase "energy savings plan" as used herein refers to a sequence of on and off periods defined over one complete long period, also referred to as a major scheduling period having a defined duration, between which this sequence of on and off periods may or may not periodically repeat. Thus, an energy saving plan spans the length of a template that is the same duration as the major scheduling period. With each savings plan a start date and an end date as well as a priority date may be associated. However, the start and end date can be such that they define a period that is: (1) greater than the duration of a major scheduling period, in which case the energy savings plan will be deemed to repeat; (2) the same length as the major scheduling period; or (3) shorter than the major scheduling period, in which case less than the complete energy savings plan will be followed.

In some embodiments, when implementing methods and systems with energy savings plans, one may upon the creation of each energy savings plan assign a start and an end date as well as a relative priority value. A user may at that time or in the future associate one or more devices with that energy savings plan. Alternatively, one may create a library of energy savings plans that have neither start dates nor end dates associated with them. Additionally or alternatively, energy savings plans may be stored with no priority values associated with them. Then at a later date, a user may associate energy savings plans with the one or more devices, and if either priority values or start dates and end dates have not been assigned by that time, then the user may be prompted to provide them. In either case, there will be one or more energy saving plans associated with the device(s), and those energy savings plans will ultimately have priorities and start dates and end dates associated with them.

A person of ordinary skill in the art will readily appreciate that the former scenario may be implemented in a manner in which by default, the start date is the date of creation of the energy savings plan and the end date is a pre-determined date in the future, e.g., one year or five years or ten years away. Additionally, there may be a default set of priorities that rank the energy savings plans in the same as the order in which the energy savings plans are input. Furthermore, in various embodiments, a user may be offered the option of making an energy savings plan inactive because it is not associated with any devices or it is only associated with devices for a time period that has expired. In some embodiments, a user may edit one or more savings plans, and the system will automatically cause those edits (with respect to priorities, start dates, end dates or times of planned on/off events) to be incorporated into applicable compiled device power state schedules either in real-time or for the next major scheduling period.

The phrase "event-driven control signal" refers to the automatic change in energy usage that is dictated by the occurrence of an event. The event may for example be when a user changes priority rankings of energy savings plans.

The phrase "major scheduling period" as used herein refers to the timespan during which energy savings plans have a complete cycle of on and off periods. For some embodiments, the major scheduling period is the minimum timespan for which the OCMDs can store in their onboard memory a complete set of planned on/off events to be executed. For illustrative purposes, the major scheduling period may be thought of as a one week period. If it is a one week period, then the OCMDs should be able to store and to execute at least one full week's worth of planned on/off events. As persons of ordinary skill in the art will recognize there is no technological barrier to defining the major scheduling period as longer (e.g., biweekly, monthly, yearly) or shorter (e.g., daily or hourly), provided that the OCMD contains sufficient memory and power to store and to execute the compiled device power state schedule for that period.

The phrase "minor scheduling period" as used herein refers to the minimum timespan for which a certain savings plan's planned on/off events may be applied to a device. For some embodiments, the minor scheduling period preferably evenly divides the major scheduling period, such that the planned on/off events defined for the complete major scheduling period will be defined as the concatenation of planned on/off events for the minor scheduled periods. If the major scheduling period is for example one week, then the minor scheduling period may for example be one day. In this case, the planned on/off events for a given savings plan may be defined and grouped by each day of a given week. Thus, there may be different on/off events for each day-long minor scheduling period within a week-long major scheduling period or, for example, there may be different minor scheduling periods for week days and week-end days over the course of a week.

An "OCMD" or "outlet control and monitoring device" is a device that is configured to be associated with a device that draws power from an electric current and a supply of that current through an outlet. For example, an OCMD may be constructed as a retrofit device that plugs into an electrical outlet on one side and receives a plug from an appliance on another side. Alternatively, an OCMD may take the form of various components embedded inside an outlet residing in the wall. The OCMD contains a conductive material that permits the transfer of electricity from the outlet to the appliance. Preferably, the OCMD also contains technology that permits monitoring of usage of electric current, storing data pertaining to the usage of electricity and contains a technology to interrupt and to restart the flow of electricity. Furthermore, it also preferably contains a memory unit and a central processing unit that are operably coupled to each other and that permit the execution an energy savings plan. An OCMD may be configured to be associated with one or more, e.g., 2, 3, 4, 5, or 6 appliances, and to control, separately or as a group, electricity flow in each device associated with it. Examples of OCMDs are disclosed in U.S. Patent Publication No. 2010-0070217 and U.S. Patent Publication No. 2010-0280979, each disclosure of which is incorporated by reference in its entirety.

The phrase "override trigger" refers to an event or a protocol that causes change in an existing energy savings plan.

The phrase "planned on/off event" as used herein refers to the beginning of one single on or off period, and when a plurality of planned on/off events are in sequence, they define an energy savings plan.

The phrase "plug load device" refers to a device that can draw electricity through a plug. Typically plug load devices are able to engage reversibly with a plug receptacle such as an outlet. Thus, removal and reinsertion does not destroy the integrity of the device or the ability of the device to function for its intended purpose. Additionally, a plug load device typically comprises a male element for insertion into an outlet. A plug load device may be inserted directly into an outlet or into another device that contains a female element into which to insert the plug load device and a male element to insert into an outlet (e.g., an OCMD). Examples of plug load devices include but are not limited to lamps, televisions, computers, stereos, refrigerators, washing machines, dryers, etc.

The phrase "real-time switch event" as used herein refers to a change in the amount of energy usage of an appliance that occurs contemporaneously with the instructions for the change.

Description of Various Embodiments

According to various embodiments, the present invention provides methods for generating a compiled device power state schedule, methods for controlling the energy usage of one or more plug load devices, systems for controlling the energy usage of one or more plug load devices, and computer program products for implementing the methods of the present invention and using the systems of the present invention. Through one or more of these various embodiments, a user can implement and use a power state control system for intelligently controlling the power state of a plurality of devices that are plugged into respective OCMDs. The OCMDs and associated devices may be found in a commercial or residential setting.

System Architecture

FIG. 1A is a block diagram illustrating an architecture of a system 100 for appliance control in accordance with one embodiment of the present invention, and it shows how various features may be coupled to one another to cause the OCMDs to execute compiled device power state schedules. The system 100 in one embodiment includes a system management node 102. The system management node 102 may be configured to perform a large number of functions related to the intelligent calculation, execution and storage of various user and system generated device control events and savings plans. It may for example reside within a physical network or as part of a computing cloud.

Communications medium 60 connects the system management node 102 and the system controllers 50 in each of the client nodes 3 (two are shown for ease of explanation, but any number are possible), as well as the client control devices 103 (which may be any device enabled for communication through communications medium 60, two are shown for ease of explanation, but any number are possible, e.g., 1-100,000, 2-50,000, 5-5,000, 10-10,000, 100-500). By way of a non-limiting example, a control device may be a smart phone or personal computer. The client nodes 3 and client control devices 103 are remote from the system management node 102 and from each other, (users who own or have permission to access devices in any given client node 3 may log in via any client control device 103, using secure, unique credentials if required by the system). Communications medium 60 may be embodied as the Internet, Extranet, packet-switched network, Virtual Private Network, using various packet-switching technologies such as Internet Protocol (IP), frame relay, and asynchronous transfer mode (ATM), among others. Client nodes 3 and client control devices 103 may also communicate over a wireless network, e.g., a cellular or satellite communications network.

As the arrow in the left of the figure shows, commands to be executed may flow from the client control devices to the system management node and then to one among a set of system controllers of a plurality of clients. As the arrow in the right of the figure shows, information and data to be viewed may flow from the devices (also referred to as appliances 4) through the OCMDs 12, to the system controller 50 of a client. Thus, a plurality of clients may make use of different system controllers, but the same system management node. The term client does not imply any particular corporate structure, and two or more divisions or units within the same corporation may be treated as different clients for the present invention as would different corporate entities. Additionally, a client can be an individual person or a group of persons.

The elements of the above described system architecture, and methods for using it are described in more detail below.

System Management Node

With reference now to FIG. 1B, system management node 102 is shown to include a set of infrastructure components. Each component or subsystem of the system may be in operable communication with other components of the system, as necessary, for example, through the use of remote method invocation ("RMI") or other component messaging services in the case of software, or bus interconnects in the case of hardware. Furthermore, the components of the system management node 102 may be located on the same physical machine, on different physical machines or on virtual machines (VMs), communicating via the above specifications and using standard networking protocol.

In one embodiment, system management node 102 includes a gateway computer 104, a computational cluster front end 106, distributed computing nodes 112, a network available storage (NAS) device 108, a transient database 110 that stores information associated with users, devices, permissions, energy savings plans, compiled schedules, and real-time device control events, and a processor 114 that dedicatedly manages an archival database 116 that robustly stores information associated with users, devices, permissions, savings plans, compiled schedules, and real-time device control events. The system management node 102 for example can take the form of a virtual machine (VM) running in the cloud.

The gateway computer 104 acts as a portal to allow the plurality of distributed system controllers 50 (see FIG. 1A) associated with the respective client nodes 3 to send information to and to receive commands from the system management node 102 via the communications medium 60. The gateway computer 104 also acts as a portal to allow the plurality of client control devices 103 associated with the respective client nodes 3 to send commands and to receive and to view information via the communications medium 60. The gateway computer 104 provides standard well-known Internet services, such as a firewall and data flow buffering, and is preferably configured to ensure that the other elements of the system management node 102 remain isolated and secure from the communications medium 60 for security purposes. The gateway computer 104 sends and receives data/instructions to and from the distributed system controllers (which can be, for example, an internet enabled computer running system software, or a dedicated gateway device running the same software), as well as the client control devices 103 (which can be, for example, users' or administrators' workplace computers, home computers, mobile smartphones or any other internet enabled device).

The data/instructions sent to the distributed system controllers and client control devices 103 may include, for example, new compiled weekly device power state schedules and real-time device control events specific to one or more devices and initiated by permitted users or system generated. Thus, users may for example send information about devices that they seek to control and receive information about these devices regardless of who authorized a change in energy usage. The data/instructions received by gateway computer 104 having been sent from the distributed system controller and the client control devices 103 may include, for example, real-time or past energy usage data for various devices, the current power states of various devices, and the current override states of various devices (i.e. whether that device's current power state has been changed, departing from that device's currently loaded compiled weekly device power state schedule). One function performed by gateway computer 104 is to confirm that the data/instructions received from the distributed system controllers 50 or client control devices 103 has not been corrupted or does not pose a security threat. In one embodiment, the gateway computer 104 forwards the data/instructions received from the various distributed system controllers or client control devices 103 to a computational cluster front end 106, which is a processor configured to perform various processing tasks including, but not limited to: (1) dispatching instructions to a plurality of distributed computing nodes 112; (2) reading from and writing to databases 110, 116; and (3) accessing data on the network available storage device (NAS) 108.

In addition to the functions described above, the cluster front end 106 may also receive requests for human, or machine, readable reports from the plurality of distributed system controllers 50 and/or the plurality of client control devices 103 via gateway computer 104. Examples of human-readable reports that may be requested by a client node 3 or client control device 103 include reports that show how much electricity a group of devices has used during a particular time period. One or more software modules resident at system management node 102 are operable and provide as output, updates regarding how much energy a particular group of devices has used at a particular client node 3. An example of a machine-readable report that may be requested by a client node 3 or client control devices 103 includes a request to receive or display the compiled daily device power state schedules for the next week for a particular device. Upon receiving a request for a report (e.g., human or machine readable), the gateway computer 104 examines the request and first confirms that it is not a security threat, privacy violation, or other malicious request. In the case that the request for a report is not a security threat, privacy violation or other malicious request, it then passes the request to the front end cluster 106 that can read from database 110 and/or database 116. The front end cluster 106, in some cases, executes the request and in other cases dispatches the request to the distributed computing nodes 112 for execution. Front end cluster 106 then returns the information provided in response to the request to gateway computer 104. Upon receiving the returned information at gateway computer 104, it formulates the data into the appropriate human- or machine-readable format, and communicates it back to the requesting client node 3 or client control device 103 via the communications medium 60.

When communicating with client control devices, the gateway computer may transmit information or allow the downloading of information that causes the client control device to display one or more images or text on a graphic user interface (GUI). Through a GUI, a user may view reports, send instructions to initiate, to terminate or to modify an energy savings plan or to create a new energy savings plan. Optionally, the user will be presented with choices of applying his or her action to a single device, to all of his or her devices or to a subset of all of his or her devices that comprise a plurality of devices. Furthermore, a user may be presented with groupings of devices and/or options to create new groupings of devices for which to apply savings plans. Alternatively, a user who modifies an energy savings plan will be deemed to have intended to modify all compiled device power state schedules for which the energy savings plan is applicable, and the system will, depending on the modified start dates, end dates, prioritizations, and/or association of devices, transmit new instructions for compiled device power state schedules.

In one embodiment, because the gateway computer 104 also interfaces with the computational cluster front end 106, if necessary, it will also perform load balancing using an algorithm such as, for example, Round Robin or Ibnamed.

Other load balancing algorithms not explicitly recited herein are also within contemplation of the invention and may facilitate the distribution of loads across available services. The gateway computer 104 watches network traffic distribution to monitor the availability of the cluster front end 108. In one embodiment, the gateway computer 104 may be embodied as a dual Quad core Intel Xeon chip, with a redundant power supply, 15,000 RPM hotswap SATA RAID1 with large memory.

The computational cluster front end 106 is used in one way to execute any large scale computational tasks received from either the gateway computer 104 or the archive database manager processor 114. In some embodiments, non-cluster machines (not shown) can interact only with the cluster front end 106. Non-limiting examples of these large scale tasks are OCMD data management, such as sorting user records, and the creation of compiled daily device power state schedules. A primary, but not exclusive function of the cluster front end 106 is to dispatch the large computational tasks it receives to the distributed computing nodes 112 and perform load balancing.

NAS device 108 is configured to provide fast, shared disk space between the distributed computing nodes 112. Transient database 110, in one embodiment, can be implemented as a relational database with binary tree indexing that provides short- to mid-term archiving of data as the data are processed by the distributed computing nodes 112.

A preferred operating system for the cluster front end 106 is the Standard ROCKS cluster, with typical hardware for the cluster front end 106 and distributed computing nodes 112 being rack mounted machines based on Dual Quad Intel Xeon chips. In one embodiment, a high-speed Myrinet connection is used between the distributed computing nodes 112 to optimize communication speeds. In the same or in a different embodiment, the cluster front end 106 uses a Sun Grid Engine for load distribution/balancing. Preferably, the NAS device has a minimum capacity of 5 TB with Gigabit Ethernet cards. Database 110 can be embodied as a MySQL cluster database implemented using multiple 1U twin Dual Quad Intel Xeon machines.

The archival database 116 is where the Compiled Schedules Database (CSD) will reside, and it stores compiled device power state schedules. Because this CSD forms the backbone of the device power state control system, the archival database 116 is preferably secure, highly reliable, and always available. As a result, the managing processor 114 should be a dedicated, highly redundant machine. A typical configuration for this archival database 116 can be, for example, a relational Oracle or MySQL database with binary tree indexing.

Generation of Compiled Device Power State Schedules

In various embodiments, the system management node is configured to cause or to allow a user to cause the generation of a compiled device power state schedule. According to these methods, one accesses a computer database that stores a plurality of energy savings plans. The database may be part of the system management node (for example a database archive) or capable of being accessed by the system management node through a wired or wireless network.

Each energy savings plan may comprise information that corresponds to a plurality of planned on/off events. These planned on/off events define relative times that correspond to when energy should be used by a device and thus the device is on and when energy should not be used by the device and thus the device is off. Preferably, the planned on/off events are a plurality of events that take place over a major scheduling period that may be defined by a duration of T1. T1 may be defined as any time period, e.g., from an hour to a year or from a day to a month. In some embodiments, T1 is a day, a week or a month. As stored within the database, in some embodiments each energy saving plan may be further defined with reference to a measurement of time T2 that defines a minor schedule period, that is a unit of time capable of being repeated, for example a day of the week and/or hour of a day and/or minute of an hour, but is capable of being differentiated from other T2s within an energy savings period. Thus, the concatenation of all T2s for a specific energy savings plan is for a period of time that equals T1. (T1=n×T2.)

By way of a non-limiting example T1 may be a week and each T2 may be a 24 hour period that corresponds to a unique day of the week (i.e., Sunday, Monday, Tuesday, Wednesday, Thursday, Friday, and Saturday) or an ordinal day within a seven day period (i.e., first, second, third, fourth, fifth, sixth and seventh). Thus, the week would define a major scheduling period and each day of the week or twenty-four hour period would define a minor scheduling period. In the present example each T2 within an energy savings plan is a different day; however, any two or more T2s could have the same or different planned on/off events. Thus, there might be the same on event at 9:00 am on week days and off event at 6:00 pm on week days, but no on event on the week-ends. This may for example corresponds to a device that is used in an office that is closed on the week-ends.

When a user desires to specify a future sequence of on and off periods to be executed by one or more OCMDs 12 that are coupled to one or more devices, that user may access a savings plan's interface of a system management node's 102. Access may be through a client control device 103 that is enabled to utilize communications medium 60. This interface allows a user to set savings plans for any devices for which that user has been given control write permission (permissions are explained in further detail below). When the user submits the savings plans, the savings plans are written to the transient database 110.

Notably, in some embodiments, a plurality of energy saving plans, and preferably all energy savings plans are defined over the same duration (e.g., a week long major scheduling period). In some embodiments, as stored in a first database, each energy savings plan does not have a specific calendar date or time associated with it or prioritization value. Thus, in these embodiments, as stored the energy savings plans form a library of templates, each of which a user who has the appropriate authorization may select and assign specific dates (e.g., a calendar time, date and year). Similarly, the user may assign priority values for the energy savings plans of that are to be associated with the same device or devices.

Thus, the system management node may be configured to permit a user who accesses it to create one or more energy savings plans and to assign a start and end date to each energy savings plan that he or she selected and a priority value to each of those energy savings plans. A priority value provides a relative ranking of the energy savings plans such that if two or more energy savings plans apply to a given device for the same calendar time, the system will know which to apply during the subsequent creation of a compiled device power state schedule.

The system may also be configured such that it compels a user to apply unique priority values each time that the user causes the system to access the database. Additionally or alternatively, the system may have default priority values assigned to each energy savings plan and offer the user the option to change them and/or alert the user to instances in which the default assigned priority values conflict with newly selected priority values and in those cases offer the user the option to reassign priorities. The user may also be provided with the opportunity to select a calendar time period to which to apply the energy savings plan e.g., Jan. 1-7, 2015.

In the above described embodiments, the energy savings plans are described as being stored without start and end dates and optionally without prioritization values. In other embodiments, when creating the energy savings plans, both of these types of data may be created and stored. Thus, in these embodiments, each time the user accessed the database, he or she might associate devices with one or more energy savings plans but not need to input start dates or end dates because they are already part of the energy savings plans. Of course, the user could amend these pieces of data at the time of associating a given energy savings plan with a device or before or after doing so.

All communications with a user may be done over a network that is wired or wireless. Preferably, access to the system management node is restricted and only users who have been granted access to the system will be able to create energy savings plans for the purpose of generating a compiled device power state schedule. In some embodiments, a user may be presented with a menu of devices over a graphic user interface for which to apply the same or different energy savings plans to different devices for the same or different calendar periods. Whenever the user makes any changes to the energy savings plans that apply to his or her devices, the system then recalculates the new compiled device power state schedules for any affected devices, for the next major scheduling period. In some embodiments, the system may by default, and unless overridden by a user, select the next calendar period that corresponds to a major scheduling period (e.g., the next Sunday to Saturday or Monday to Sunday) as the date range for which selection is being made and all of the devices for which the user has authorization to control. Additionally, if a user does not provide any active or relevant energy savings plans from which to generate a compiled device power state schedule for a given device at a given time, the system may cause the most recent one to be repeated, or the system may cause a default compiled device power state schedule, such as an always on or always off schedule to be executed.

After creation, deletion, or editing of the energy savings plans has been completed and the start date, end date, priority value and device designations have been associated with each of the selected energy plans, the system may cause a computer algorithm to be applied through the use of a computer processor on a local computer, on network or in a computing cloud to generate an output. The output may be in one or more of the following formats: a file on a non-transitory storage medium, a printout or a display on a graphic user interface. The output comprises a compiled device power state schedule and provides information for a time period XY that may be defined with X being a start and Y being an end. For example, XY may be defined by starting on a calendar date at time X and ending on a calendar date at time Y. The length of the time period from X to Y is T1, which is the same length of time as the energy savings plans described above. The output may further comprise a designation of one or more outlet control and monitoring devices for the compiled device power state schedule.

The compiled device power state schedule is formed when for each minor scheduling period within XY the algorithm analyzes the plurality of energy savings plans to determine which energy savings plan that has a start date that is before or the same as the minor scheduling period within XY and an end date that is after or the same as the minor scheduling period within XY has the greatest priority for incorporation into the compiled device power state schedule. Because each relevant energy savings plan may have different start and end dates that partially overlap the calendar time period XY, the compiled device power state schedule may draw planned on/off events from a plurality of different energy saving plans.

The process for generating the compiled device power state schedule may be further illustrated by reference to Table I below. For purposes of illustration, for each minor scheduling period, which is in this case one day long, a single time for the devices to turn on is provided, and a single (later) time for the devices to turn off is provided. Also provided is an indication (Y/N) whether the user wants to include the energy savings plan when the compiled device power state schedule is generated, the priority of each plan and a start date and an end date for each plan.

TABLE I

Energy Savings Plans

| Plan | Mon | Tues | Wed | Thurs | Fri | Sat | Sun | Y/N | Priority | Start/end |
|------|-----|------|-----|-------|-----|-----|-----|-----|----------|-----------|
| A | 7 am | 7 am | 9 am | 7 am | 7 am | 10 am | 11 am | Y | 2 | Jan. 3, 2015 |
|   | 5 pm | 5 pm | 6 pm | 5 pm | 5 pm | 2 pm | 2 pm |   |   | Jan. 14, 2015 |
| B | 6 am | 6 am | 6 am | 6 am | 6 am | 6 am | 6 am | Y | 3 | Jan. 6, 2015 |
|   | 11 am | 11 am | 11 am | 11 am | 11 am | 11 am | 11 am |   |   | Jan. 6, 2016 |
| C | 8 am | 8 am | 8 am | 8 am | 8 am | 8 am | 8 am | N | N/A | N/A |
|   | 2 pm | 2 pm | 2 pm | 2 pm | 2 pm | 2 pm | 2 pm |   |   |   |
| D | 8 am | 8 am | 8 am | 8 am | 8 am | 8 am | 8 am | Y | 1 | Jan. 7, 2015 |
|   | 2 pm | 2 pm | 2 pm | 2 pm | 2 pm | 2 pm | 2 pm |   |   | Jan. 10, 2015 |

The user may also note that he or she wishes to generate a complied device power state schedule for Monday, Jan. 5, 2015 to Sunday, Jan. 11, 2015. For Monday, January $5^{th}$, only plan A is in force. Thus, data for that minor scheduling period will be extracted from energy savings plan A. For Tuesday, January $6^{th}$, both plans A and B are in force, but because plan A has higher priority, the data will come from that plan. For Wednesday, January $7^{th}$ through Saturday January $10^{th}$, plans A, B and D are in force; however, because plan D has the highest priority, for those four minor scheduling periods, data will come from plan D. For Sunday, January $11^{th}$, only plan A is in force. Accordingly, data for that minor scheduling period will come from plans A and B are in force, but A has the higher priority value. The results are summarized in Table II. Notably, plan C is not considered because the user designated this plan as "inactive", and no data is taken from plan B, because although the user selected it, plan B has the lowest priority and every date for which it was selected with the time period of January $5^{th}$ through $11^{th}$ at least one other plan was selected. (However, note that even if the user makes no changes in the next week, the system will automatically recalculate compiled device power state schedules in one week, and plan B would be in the result set for Thursday, January $15^{th}$ through Sunday, January $18^{th}$).

TABLE II

Complied Device Power State Schedule

| Plan | Mon. | Tues. | Wed. | Thurs | Fri | Sat | Sun. | Period |
|------|------|-------|------|-------|-----|-----|------|--------|
| Compiled | 7 am | 7 am | 8 am | 8 am | 8 am | 8 am | 11 am | Jan. 4, 2015 |
|   | 5 pm | 5 pm | 2 pm | 2 pm | 2 pm | 2 pm | 2 pm | Jan. 11, 2015 |

As illustrated above, each minor scheduling period may be defined by reference to a day of the week, and X and Y are each defined by a calendar date and time. Additionally, if the start date of an energy savings plan and the end date of an energy savings plan define a period greater than T1 (as with the dates for selected plans A and B), then the algorithm deems the energy savings plan to repeat over the time period between the start date and the end date. For example, in some embodiments, every Monday for an energy savings plan would have the same planned on/off periods. By using a system management node is combination with the system controller, one can control the energy usage of a one or more plug load devices through the use of a compiled device power state schedule.

Dissemination of Compiled Device Power State

After the system management node generates compiled device power state schedules for a plurality of devices operationally coupled to a given system controller, it may transmit the compiled device power state schedules to that system controller. Optionally, it may also transmit the compiled device power state schedules to the user and/or supervisor of the user for review or for informational purposes.

When a compiled daily device power state schedule has been calculated for each device and for each day until some point in the future (in some embodiments, this point in the future may not be less than one major scheduling period from the moment of calculation), the system management node 102 triggers messages to be sent to any system controllers 50 that are associated with the OCMDs 12 that are coupled to the applicable devices. A single message may be sent to each system controller 50 that contains a plurality or all compiled daily device power state schedules for that system controller. This message, may be referred to as a "weekly schedule message" (this name implies that the message contains a compiled weekly device power state schedule and does not necessarily indicate the frequency with which this message is sent) and contains the compiled weekly device power state schedule for each applicable device associated with that system controller 50.

This weekly schedule message may also indicate which channel of the OCMD 12 should execute a given compiled weekly device power state schedule, according to which device is coupled to which OCMD 12 channel (given that a single OCMD 12 may have multiple plugs or "channels" associated with it, each of which is coupled to a single device). This weekly schedule message is added to a messaging queue on the system management node 50, then sent over communications medium 60 and received by the server link messaging manager 61 of the system controller 50. The weekly schedule message is then sent down to the client data and command processing application 65, which determines and confirms which information within the message needs to be sent to which OCMDs 12. When the client data and command processing application 65 receives the weekly schedule message, it compares the compiled weekly device power state schedule for each OCMD 12 channel in the message with the compiled weekly device power state schedule that is currently loaded on that OCMD 12 channel and stored in the client database 56, which is in communication with the data packaging module 54.

The data packaging module puts data in a form that facilitates storage and/or transmission. The data packaging module is also coupled to the data uploading module 52, which facilitates the receipt of data. If the new information from the message is different than the current information loaded on the OCMD 12 channel, the new compiled weekly device power state schedule is passed to the device schedule manager 63, along with its destination OCMD 12 channel.

Client Node and System Controller

Figure 1C:
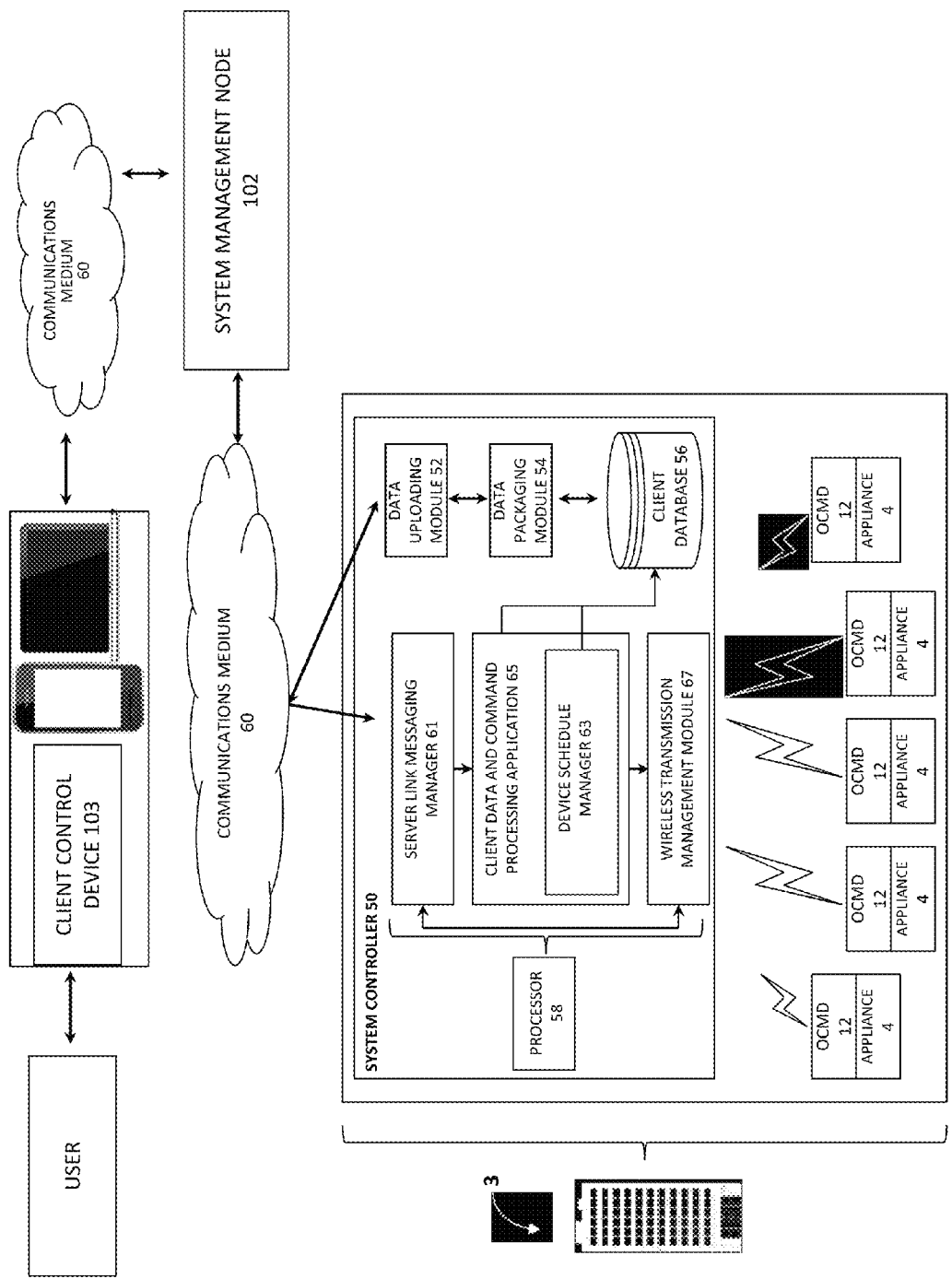
FIG. 1C is a detailed illustration of a client node of an embodiment of the invention.

With reference now to FIG. 1C, a typical client node, e.g., client node 3, is shown to include, according to an embodiment, a set of infrastructure components. Each component or subsystem of client node 3 may be in operable communication with other components of client node 3, as necessary, for example, through the use of wireless communication protocols, remote method invocation ("RMI") or other component messaging services in the case of software, or bus interconnects in the case of hardware.

In some embodiments, client node 3 includes a system controller 50 and a plurality of outlet control and monitoring devices (OCMDs) 12 in communication with the system controller 50. The system controller 50 is sometimes referred to herein as a residential or commercial client computer, but it can also be a dedicated gateway device. Each OCMD 12 is coupled to a particular device at the client node 3. The process of coupling OCMD's 12 to devices to control and to collect energy usage data therefrom is discussed in greater detail in application Ser. No. 12/284,051, which published on Mar. 18, 2010 as U.S. Patent Pub. No. US 2010-0070217 A1, and is incorporated by reference herein in its entirety.

System controller 50 communicates with the management entity node 102 via the communication medium 60. The plurality of OCMDs 12 wirelessly communicate with the system controller 50.

As shown in FIGS. 1A and 1C, each of the pluralities of OCMDs 12 at each client node 3 wirelessly communicates its respective electrical and non-electrical coupled device information to a respective co-located system controller 50. For example, for a particular device (e.g., printer, water cooler, etc.) located at a particular client node 3, an OCMD 12 electrically coupled to the particular device detects and records the electrical and non-electrical information generated by the particular device and wirelessly communicates this information to the system controller 50. The system controller 50 collects, stores and analyzes the data collected by and transmitted from the OCMD 12 coupled to the particular device. It also allows users to view this data (for example, each device's energy usage over time) through client control devices 103 (for example, a residential or commercial client computer via an internet browser, or a mobile smart phone via a mobile application), and provides an interface for the user to exercise real-time or future scheduled control of the OCMDs 12 and their associated devices. This process is continuous, whereby a user, or any number of users, may create new device control events based on up-to-date energy usage information. The real-time control may be used by a user, through his or her control device to override a complied device power state schedule that is being implemented. Communications for real-time overrides may for example flow from the client control device to the system management node to the system controller to the OCMD that is associated with a particular device or devices.

With reference again to FIG. 1A-1C, details of the system management node 102 and system controller 50 are shown to illustrate an embodiment of the invention. As described herein and illustrated in the attendant figures, the device power state control system 100 utilizes a system management node 102 remote from the client node 3 and system controller 50 that can be, in one embodiment, a typical commercial setting, including, without limitation, a small office or large office building. However, it should be understood that the invention has much broader applicability. In particular, it should be understood by those skilled in the art and guided by the teachings provided herein that the device power state control system 100 may be used in other suitable settings, including, for example, residential, industrial and utility applications. Other suitable settings will also be apparent to the reader. Furthermore, system controllers can be designed to process data and to communicate with a set of OCMDs that are associated with a client and optionally grouped by building, floor, office or cubicle.

With continued reference to FIG. 1C, system controller 50 includes a conventional computer processor 58 running operating software described herein that provides the necessary functionality of the operations described herein. It is understood that processor 58 includes other typical components readily known to the reader, for example operating system software (e.g., Intel-based operating system, Unix-based operating system), user interfaces, etc. One of the provided interfaces included with processor 58 is for communicating with the plurality of OCMDs, via wireless links, wired links or combinations thereof. The OCMDs 12 are communicably coupled to various electrical outlets found within the building 3. The outlets found within a building are generally installed in a per-cubicle and/or per-office and/or per-floor basis.

Appliances 4 in each client node 3 are electrically coupled to the various OCMDs 12. The OCMDs are configured to be able to turn on or shut off the flow of power to each of its associated devices at certain periodic, predictable or unpredictable times or during certain periodic, predictable or unpredictable intervals based on over-the-air control signals received from the system controller 50. The OCMDs 12 also have onboard memory to execute real-time control signal events and to store historical and/or future scheduled control signal events, as well as device operating information. Thus, data from the system controller may cause a real-time change in electricity usage or a future change in electricity usage. The OCMDs 12 are also configured to transmit metering data associated with the electrically coupled devices 4 to the system controller 50, either periodically or on demand. Optionally, in some embodiments the OCMDs contain manual overrides that permit a user who is in physical proximity of the OCMD to cause the OCMD to temporarily deviate from its memory stored compiled device power state schedule, to an always on state, for example.

An interface of the system controller 50, e.g., the wireless transmission management module (WTMM) interface 67 transmits real time and future device control event signals to each of the plurality of OCMDs 12. The WTMM interface 67 also receives at least one characteristic of the electrically coupled devices' 4 electrical consumption, such as current, voltage, or power waveform data from the plurality of OCMDs 12. The WTMM interface 67 is capable of sending and receiving time-stamped secure packet messages to and from each OCMD 12. The WTMM interface 67 queues the data packet transmissions in a FIFO fashion from the respective OCMDs 12.

In one embodiment, the OCMDs 12 communicate with system controller 50 via wireless links using a low-power wireless communications protocol such as the ZigBee protocol or the like. ZigBee is built on an Institute of Electrical and Electronics Engineers (IEEE) global standard, 802.15.4, similar to the standards that govern Bluetooth and Wi-Fi, either of which may be used.

OCMDs

The OCMDs 12 associated with each building 3 include hardware circuitry and software components required for communicating via ZigBee or another wireless protocol with system controller 50. In one embodiment, communications are initiated by a user exercising control via a client control device 103. The system management node 102 displays a graphical user interface (GUI), exposing certain controls, including but not limited to the ability to control present or future the power state of various OCMDs and their associated devices, to the user based on previously configured permissions and network configurations.

The user generates a control signal with input to the GUI. Communications are passed over the communications medium 60 to the system controller 50, are received by the server link messaging manager 61 and are processed by the client application running thereon. The client data and command processing application 65 interprets communications and applies individual commands to the relevant OCMDs 12. The device schedule manager 63 encodes control signals so that they can be interpreted by OCMDs 12. Finally, communications proceed through the WTMM interface 67 of the system controller 50 to a ZigBee Trust Center module included in a USB and plugged into the system controller's 50 client computer or built into the client hardware itself. Communications will then be transmitted to another ZigBee node module included as a component of each OCMD 12. OCMDs 12 then execute commands, storing future scheduled on/off periods and/or executing the present on/off command. OCMDs 12 also have onboard memory to store and execute future scheduled device control events and cache energy usage information in the case where the system controller 50 is temporarily out of communication due to spatial or other factors.

Encoding the Compiled Device Power Schedule

The device schedule manager 63 encodes the ordered list of compiled planned on/off events that translates the compiled device power state schedule into a compressed form that is able to be interpreted by OCMDs 12. This information may be encoded in various ways, utilizing encoding and computing methods known by those skilled in the art.

In one embodiment, the ordered list of compiled planned on/off events are encoded as a series of bytes, wherein each byte corresponds to one or part of one compiled planned on/off event. The most significant bit (MSB) represents the power state of a given compiled planned on/off event (in one embodiment, a 1 value is interpreted as "on", while a 0 value is interpreted as "off"). The remaining seven bits represent the duration of that given compiled planned on/off event, or more specifically, the amount of time between the given compiled planned on/off event until the next compiled planned on/off event. In one embodiment, these seven bits represent a number that must be multiplied by some constant minimum control interval (which may be any period of time that is greater than zero and less than the minor scheduling period and which must evenly divide the minor scheduling period).

For the sake of explanation, the minimum control interval may be assumed to be fifteen minutes. Thus, the maximum duration represented by a single byte would be 0b1111111=0x 7F=127*15=1905 minutes, or 31.75 hours. If a given compiled planned on/off event has a duration longer than this maximum, then that compiled on/off event must be expressed as two or more bytes, all of which would have the same MSB, and whose durations would sum to the total duration of the compiled on/off event. In this way, the complete sequence of compiled planned on/off events of the compiled weekly device power state schedule are converted into a corresponding complete list of bytes which represent the power state of the OCMD 12 channel for the full week.

This sequence of bytes is then loaded into the wireless transmission management module 67 (WTMM). The WTMM packages this list of bytes, in one embodiment prepending bytes for the network address of the OCMD 12 destination and the channel designation, as well as appending security measures such as a checksum. In one embodiment, the WTMM then sends this final message, or packet, through the ZigBee Trust Center and over the air to the relevant OCMD 12. The ZigBee node onboard the OCMD 12 receives this message and relays the information to the application running on the OCMD 12 microcontroller. (As persons of ordinary skill in the art will recognize, rather than relying on ZigBee one may use commercially available Wi-Fi technology. In this way, the OCMD 12 interprets, saves and implements the compiled weekly device power state schedule, switching the power supply to its device(s) on or off according to the schedule.

By sending the compiled device power state schedule to the system controller, the system controller is caused to activate its own protocols for receiving and interpreting the information. For example, the system controller will review the time period and devices to which it applies and queue the compiled device power state schedule for transmission to the one or more outlet control and monitoring devices that correspond the designated plug load devices. As a person of ordinary skill in the art will appreciate, the designations of plug outlet devices is a proxy for designating the outlet control and monitoring devices that are associated with the plug outlet devices. Preferably the outlet control and monitoring devices are configured to implement the compiled device power state schedule at the scheduled time.

Methods for Controlling Plug Load Devices in Real Time

In some embodiments, the system is configured to permit a user to execute a change in on or off state in real time. When a user desires to exercise real time control over the power state of a device coupled to an OCMD 12, a user may access a device control dashboard interface of the system management node's 102 GUI, which may be accessed through any client control device 103 enabled to utilize communications medium 60. Information input by the user is sent through communications medium 60 and processed and executed on the system management node 102. In some embodiments, the system comprises a real time module that permits users to control devices in real time. This real time module may be part of or operably coupled to the system management node and may be stored in a non-transitory medium.

The GUI may provide a list of individual devices, or groups of devices that may be easily grouped and/or sorted according to any number of various criteria. For each device or group of devices, this GUI provides some user initiated mechanism, which may be but is not limited to, a clickable web "On/Off" button that initiates a command to be sent to the relevant OCMD 12 coupled to each device to switch the power supply to that device on or off in real time.

The GUI may also display the current power state of each device, based on the compiled planned on/off event corresponding to the current time of day and according to the relevant compiled daily device power state schedule for the device on the current day, as well as periodic data regarding the OCMD override state, which is sent from the OCMD to the system controller and then to the system management node and stored in the transient database 110. Each time the user views this GUI, the current power state of each device may be calculated in this manner, by fetching the current schedule information for each device (this schedule information is stored in the transient database 110, having been calculated upon a change in the energy savings plans logic, or otherwise calculated at periodic intervals). Therefore, if a given device is currently "Off," the GUI allows the user to change it to "On" and vice versa. This method causes the request of the complete list of the device groups from the transient database 110 for which the current user has read, write and control permissions, and sends these groups back to the client control device 103 to be viewed by the user.

A Group of devices may be defined by and stored with a number of defined properties, including, but not limited to a list of included devices, a group name, and a date that the group was created. The interface allows the user to sort the Groups that are being viewed by any number of these criteria, including, but not limited to, number of devices, name (alphabetical), date of creation, etc. The interface may also be configured to allow the user to expand and condense the Groups that are being viewed, so that the user may click on any given group name to see all devices that compose that Group, and click again to condense the Group and hide its device list. The interface may also be configured to expose a mechanism by which a user may create a new Group.

The Group creation interface allows the user to specify the aforementioned defining properties of the new Group (and optionally assign a name), and select devices either individually, or by previously defined Groups, to be included in the new Group. Note that when devices are first added to the system, they are stored in the transient database 110 with various defining properties including, but not limited to, the device location (locations are defined by user or system administrator), the specific OCMD 12 and channel to which the device is coupled (especially for the case where an OCMD 12 may have multiple plugs and thus be coupled to multiple devices), by which user the device is owned, to which client node 3 the device belongs, to which system controller 50 the device belongs (in the case that one client node has multiple system controllers 50), and to which device type the device belongs (in one embodiment, default device types are defined by the system, and system administrators and/or users may add new device types as necessary).

Similarly, after a device is added to the system, other properties of the device are discovered by the system, including but not limited to, the date of the latest energy reading, and the average power consumed. Thus, devices are stored with and may be viewed and sorted by and therefore easily grouped by any of the above properties or criteria using the Group creation interface. When the user submits his or her complete specifications for a new Group, this information is sent from the user's client control device 103 through communications medium 60, processed by the system management node 102 and stored on transient database 110.

In one embodiment, when changing the current power state of given device in real time, a user may have three separate intended outcomes defined by how long the user wishes the real time control state to stay in effect: (1) the device would resume its previously loaded compiled power state schedule upon the next subsequent planned on/off event with the power state opposite of the real time exercised power state, herein referred to as a "current event override"; (2) the device would resume its previously loaded compiled power state schedule after some set interval, herein referred to as a "timed override"; and (3) the device would forget its previously loaded compiled power state schedule and remain in the real time exercised power state indefinitely, or until further user interaction, herein referred to as a "permanent override." In another embodiment, a user can choose which of these three intended outcomes to apply to each instance of exercising real time control. A user can also set a default behavior so that one of these intended outcomes would be executed every time.

The first of these possible intended outcomes requires a different system level execution than the second and third. In the case of a current event override, the system management node 102 generates a new energy savings plan with a start date and an end date equal to the current date, sequence of planned on/off events equal to that of the current relevant plan's planned on/off events with the exception of the current planned on/off event that the user has overridden, list of devices consisting of those devices over which the user has selected to express real time power state control through the GUI, and priority higher than any existing active plan for those devices. This user generated energy savings plan is written to the transient database 110 with all of the other energy savings plans. At this point, the compiled daily device power state schedules are recalculated for all affected devices to include the effects of the new, system generated energy savings plan. New weekly schedule messages are then sent to all relevant OCMDs 12 with the result that the current scheduled power state is reversed, and the OCMD 12 will resume its normal loaded planned on/off events upon the time of the next subsequent event of opposite power state. For example, if a device was scheduled OFF Monday at 00:00, ON Monday at 05:00 and OFF Monday at 08:00, and the user executed a current event override on Monday at 02:00, the device would switch from OFF to ON in real time at 02:00, and then turn OFF at 08:00, resuming its normal compiled power state schedule.

In the case of either a timed override or a permanent override, the savings plan framework is unaffected and the system management node 102 causes the OCMDs 12 to switch their power state via a different mechanism. In both timed and permanent overrides, the message and mechanism of delivery to the OCMDs 12 is the same. The difference, then, is due to a preference called the "Schedule Override Timeout" set by the user, which dictates for how long the currently commanded power state command should be implemented before returning to the planned on/off events of the OCMDs 12 loaded schedule. In one embodiment, the Schedule Override Timeout may be set to any integer number of minutes, resulting in timed overrides, or to a value of "Never," resulting in permanent overrides. In another embodiment, users may choose the value to apply to each instance of exercising real time control. Users may also set a default Schedule Override Timeout so that one of these intended outcomes would be executed every time. In either case, the system management node 102 triggers messages to be sent to any system controllers 50 that are associated with the OCMDs 12 that are coupled to the affected devices being overridden. Preferably, a single message is sent to each system controller 50. For each affected device, this message contains the identification of the relevant OCMD 12 and channel position coupled to the device and the commanded power state. This message, herein referred to as an "override message" is interpreted by the OCMDs 12 as an instruction to leave the default behavior, "scheduling mode," and enter "override mode," in which the OCMD 12 ignores its loaded schedules and remains in the designated power state indefinitely (in the case of a timed override, the OCMDs 12 are instructed to resume scheduling mode after the specified override timeout has elapsed).

This override message is added to a messaging queue on the system management node 50, then sent over communications medium 60 and received by the server link messaging manager 61 of the system controller 50. The override message is then sent down to the client data and command processing application 65, which determines and confirms which information within the message needs to be sent to which OCMDs 12, then delivers the message content (encoded as a header, specifying override mode, along with the power state, 0x00 for OFF and 0x01 for ON) straight to the WTMM 6767. The WTMM 67 packages this as a list of bytes, in one embodiment prepending bytes for the network address of the OCMD 12 destination and the channel designation, as well as appending security measures such as a checksum. The WTMM 67 then sends this final message, or packet, through the ZigBee Trust Center and over the air to the relevant OCMD 12. The ZigBee node onboard the OCMD 12 receives this message and relays the information to the application running on the OCMD microcontroller. In this way, the OCMD interprets, saves and implements the desired real time control command, switching the power supply to its device(s) on or off accordingly.

Additionally, in the case of a timed override, the system controller 50 saves the override timeout value in the client database 56. Anytime that the override value is changed by the user (using the aforementioned GUI), the system controller 50 is notified by a similar messaging procedure as has been previously described. The system controller 50 is also made aware of all OCMDs' 12 current mode (scheduling or override) because the inclusion of this information is encoded in the other packets, constantly exchanged between the ZigBee Trust Center and the ZigBee nodes onboard the OCMDs, such as packets that contain OCMD 12 energy readings. The moment that system controller 50 receives information that an OCMD 12 has entered override mode, system controller 50 stores this information with a timestamp in client database 56. After the designated override timeout period has elapsed, system controller 50 sends a message through the client data and command processing application 65 and to the WTMM 67. This message is encoded as a header that designates that it should be interpreted as a command to enter scheduling mode. The WTMM 67 packages this as a list of bytes, in one embodiment prepending bytes for the network address of the OCMD 12 destination and the channel designation, as well as appending security measures such as a checksum. The WTMM 67 then sends this final message, or packet, through the ZigBee Trust Center and over the air to the relevant OCMD 12. The ZigBee node onboard the OCMD 12 receives this message and relays the information to the application running on the OCMD 12 microcontroller. In this way, the OCMD 12 interprets, saves and implements the command to resume scheduling mode, switching the power supply to its device(s) on or off according to its previously loaded compiled weekly device power state schedule.

To prevent against any denial of service or decline in productivity, the device power state control system 100 provides the user a method for locally, manually overriding an OCMD 12 currently executing an OFF planned on/off event. Significantly, the local, manual override function of an OCMD 12 is always available, regardless of the state of the system controller 50 or the system management node 102, and regardless of the wireless connectivity between a given OCMD 12 and the system controller 50. In one embodiment, the local, manual override is accomplished by the user physically pressing a button on the OCMD 12. This action is interpreted by the OCMD 12 microcontroller just like an over-the-air command for an ON timed override or permanent override. Similarly, the override timeout mechanism (if a value other than "Never" has been set by the user) applies in the same way as is described above. Additionally, a user may press the OCMD 12 button again to exit override mode and resume schedule mode. In some embodiments, the device power state control system 100 provides indicators when an OCMD 12 is in override mode. For example, there may be an LED light on the OCMD 12 that blinks when the OCMD 12 is in override mode, and an override icon may appear on the system management node 102 GUI Control Page, next to each device coupled to an OCMD 12 channel currently in override mode.

Permissions

The device power state control system 100 may be configured with a permissions framework, whereby each registered user associated with a given client node 3, is assigned to any number of levels of control, each level of control having different sets of control permissions over different sets of resources, including OCMDs and their associated devices.

In addition to allowing specific users various control functions over specific resources, levels of control also dictate the priority of specific users' commands over resources in the case of a conflict. While any number of levels of control are possible (e.g. 1-10, 3-100, etc.), in one embodiment, the first level of control is the super-admin. The user who initially sets up the account is automatically assigned to this level of control. This user is allowed to set a custom tiered structure of levels of control and assign other users to these levels. For example, the custom tiered structure of levels of control may be assigned as follows, in order not only to allow the super-admin to set a general savings plan across all or many devices across the system, but also to allow users on lower levels to overrule this general plan in the rare case that it conflicts with an actual user's (or group's or floor's) behavior. The higher level user (i.e. super-admin) has general information and is able to implement a savings plan easily (or exercise real-time control) that is generally applicable to most devices in the entire system (i.e. control permission over more devices, but with lower priority). The lower level user (i.e. cubicle-admin) has specific information about individual usage habits, and may easily create a savings plan for its own devices in the case that the higher level user's plan does not apply or causes conflict for some of the lower level user's devices (i.e. control permission over less devices, but with higher priority). For example, in one embodiment, the super-admin could set up a tiered structure as follows, in ascending order of priority but descending order of control permission, as explained above: super-admin, building-admin, floor-admin, group-admin, cubicle-user, read-only user. The super-admin may assign each of these levels specific permissions to view energy usage and control power state of separate overlapping or distinct groups of devices. Thus, in some embodiments the greater a person's ability to control an individual device (i.e. the higher priority that he or she has), the smaller the number of devices that he or she may control.

In some embodiments, the super-admin may have view and control privileges for all devices in the system. The super-admin may correspondingly assign its own level the lowest control priority. The system may have a small number of users assigned to the level of building-admin (e.g., 2-10 or 3-5), each of whom has view and control of only the devices in their respective buildings, with priority to control and schedule these devices, overruling a super-admin's savings plan if necessary. Similarly, there may be a large number of users assigned to the level of floor-admin (e.g., 10-50 or 20-30), for each building, each of whom has view and control of only the devices on their respective floors, with priority to control and schedule these devices, overruling a super-admin's or building-admin's savings plan if necessary. There may be even more users assigned to the level of group-admin (e.g., 20-200 or 75-150), a small number (e.g., 2-5) for each floor, each of whom has view and control of only the devices in their respective groups, and have priority to control and schedule these devices, overruling a super-admin's, building-admin's or floor-admin's savings plan if necessary. And finally, there may be an even larger number of users assigned to the level of cubicle-user, (e.g., 200-2000 or 750-1500), each of whom has view and control of only the devices in their respective cubicles, with priority to control and schedule these devices, overruling all previous levels of control. A read-only-user may have view privileges, but no control privileges, over some or all devices. A manual override would have the ultimate priority in such a configuration.

The system for appliance control 100 could be configured using the above logical structure, or any other logical, or non-logical structure whereby any number of levels of control are possible, with any order of priority, with any number of users at each level, with any number of devices, and whereby all combinations and permutations of levels of control, priorities, permissions, and devices are possible. For example, the greatest priorities could be given to persons who oversee the greatest number of outlets. In the case of a savings plan conflict (i.e. multiple savings plans created by different users apply to a given device on a given day) the savings plan created by the user at the higher priority level of control would receive higher priority. In the case of a savings plan conflict where the savings plans in question were created by the same user, or by users at the same level of control, the savings plan that was created more recently would receive higher priority.

Furthermore, in one embodiment, the super-admin may set a variety of system priority configuration settings that further define the interaction between users assigned to different levels of control with different priorities, especially in the case of a device control conflict as described above. These system priority configuration settings include, but are not limited to, alert and approval settings, whereby the system may alert involved users in the case of a device control conflict, or the system may require a user whose devices are being controlled or whose savings plan is being overruled, to approve this fact before the new, overruling control event or savings plan takes effect. In the case of a device control conflict, in one example, the lower priority user is alerted that his device is being controlled or his savings plan has been overruled or overridden, along with relevant details, (i.e. which user initiated the overruling, and for which appliances). In another example (which may coexist with the first), the higher priority user is alerted before initiating the conflicting control event or savings plan, that this action will result in a device control conflict, with relevant details (i.e. which user's devices or savings plans will be overridden or overruled). System alert settings define communication (i.e. which parties are notified of an action), but do not affect implementation (i.e. what action is actually taken by the system and when).

System approval settings, on the other hand, affect both communication and implementation. For the sake of explanation, system approval settings are presented by the degree to which they restrict device control in the system, although any setting along this spectrum of restrictiveness is possible. In the most restrictive embodiment, approval settings would be set such that any device control conflict must be approved by the overruled or overridden party before being implemented. For example, in the permission/priority configuration defined above, if a super-admin were to create a savings plan for all devices in the system, that savings plan would need to be approved by each building-admin for their respective buildings, then by each floor-admin for their respective floors, then by each group-admin and cubicle-admin for their individual devices before taking effect. Thus, the lower priority user's control is very restricted by higher priority users. Similarly, in one embodiment, in the most restrictive case, the inverse may also be true: i.e. if a cubicle-admin overrules the savings plan previously created by the super-admin, the overruling savings plan would not take effect until the super-admin approves it. This scheme is the most restrictive because conflicts do not go into effect until approved, regardless of priority. Contrarily, in the least restrictive case, no acknowledgement is necessary for a higher priority user to overrule or override a lower priority user or for a lower priority user to control or schedule devices owned by a higher priority user as long as this control does not overrule or override the higher priority user. These two extremes are provided for the sake of brevity, although all combinations defining approval settings between adjacent levels of control are possible according to, (but not limited by) the following statement with its corresponding bracketed, slash-separated options:

Users at a [HIGHER/LOWER] level of control may [CONTROL/OVERRIDE/OVERRULE] [DEVICES/SAVINGS PLANS] owned by users of [LOWER/HIGHER] level of control [WITH/WITHOUT] approval Using this format, a user with permission to set system priority configuration settings may set any number of rules selecting any non-conflicting combination of options as presented above. In one embodiment, users at each level of control may set system priority settings for themselves and users in lower levels, or may delegate this to users at lower levels. Again, all permutations and combinations are possible, in order that the system may be easily adapted for different real life scenarios.

One of the aforementioned innovations of the system 100 for appliance control is the ability to provide simultaneously unprecedented granularity of control as well as breadth of control, whereby any user assigned to any level of control can easily and quickly set a savings plan for, or exercise real time remote control of one single device, or of thousands of devices across the entire system. One mechanism by which this innovation is achieved is the system's device grouping framework, whereby users are able to manually or automatically organize any distinct or overlapping subset of devices, grouping them randomly, or by any number of user-defined or system-defined criteria. The user may always access devices individually, by automatic system-defined groups, or by custom user-defined groups.

The utility and benefits of the system's device grouping framework may be expressed in the following embodiment, which is provided for illustrative purposes. Assume that a building administrator knows that the employees on floors two and seven stay later on Tuesdays and Wednesdays. That building administrator may set a new savings plan for the relevant devices owned by users on those floors.

First, the building administrator would access the group creation interface using a client control device 103. The building administrator would create a new group, named, for example, "Floor 2 & 7 Devices." The building administrator would use the sorting and grouping tools described above to select quickly and easily all devices on the second and seventh floors to compose this group. If the devices for those floors were already in defined groups by floor, the building administrator would just select the Floor 2 group and the Floor 7 group. If floor groups were not yet defined, the building administrator would sort all devices by floor, and then select all devices on floor 2 and floor 7. Thus, this specific group, which may consist of thousands of devices, may be created easily. Now that the group of devices is defined, the building administrator would access the savings plans interface, defining the new savings plan with applicable start and end dates, planned on/off events that reflect the later work hours on Tuesdays and Wednesdays, and with "Floor 2 & 7 Devices" as the being applied to the new savings plan. In a similar example, the building administrator may accomplish the same task in a single interface (the savings plans interface), whereby the savings plan is created, and the relevant devices are selected by previously defined group, or sorted and selected individually, directly from the savings plans interface, device selection step. In this case, the system would give the option to create automatically a new group with the custom selection of devices for this savings plan. In this way, extraordinary breadth of control becomes easily accessible by users having permission to view and control thousands of devices.

Similarly, the system for device control allows an unprecedented granularity of control. In the above embodiment, for example, it could be imagined that one single employee on the seventh floor does not work late on Tuesdays and Wednesdays, even though the rest of the seventh floor does. If the building administrator were alerted to this exception, the building administrator could easily edit the savings plan created in the example above to exclude the few devices owned by this single employee. In the savings plan interface, the building administrator would select the Edit option for the given savings plan. In the device selection step, the group "Floor 2 & 7 Devices" could be expanded in order to view all devices in the group. The expanded member devices could be sorted by floor, then by user, and in this way, the single employee's devices could be quickly identified and de-selected by the building administrator. Similarly, if the building administrator were not alerted to the single employee's irregular hours, the system would also provide various mechanisms by which the employee could remedy this situation himself. As the cubicle administrator of his own cubicle, the employee could opt out of the building admin's plan, (in the case that the lower level of control has higher priority) or could create a new savings plan to overrule the building admin's plan. The employee could also manually override the building admin's plan each evening (or just once forever if there was no defined override timeout). In this way, extraordinary granularity of control becomes easily accessible, both for the building administrator (who has access to thousands of devices) and for the single employee or cubicle administrator (who has access to only his or her own few devices).

Control from a Plurality of Devices

The above described embodiments can be used for controlling a plurality of plug load devices. In some of these embodiments, the system management node generates a plurality of compiled device power state schedules comprising a first compiled device power state schedule and a second compiled device power state schedule, wherein the first compiled device power state schedule provides instructions to be transmitted to a first outlet control and monitoring device and the second compiled device power state schedule provides instructions to be transmitted to a second outlet control and monitoring device. Optionally, the first outlet control and monitoring device and the second outlet control and monitoring device are operably coupled to the same system controller.

In some embodiments, the first compiled device power state schedule is transmitted to a first system controller and the second compiled device power state schedule is transmitted to a second system controller. The system management node, for example, may be configured to communicate with 2-100 system controllers.

Additionally, in some embodiments, the instructions are received from a first user and a second user and the instructions from said first user and said second user identify a common plug load device and further wherein when generating the compiled device power state schedule, each priority rule of the first user takes precedent over each priority rule of the second user. In other embodiments instructions are received from additional users, i.e., third, fourth, fifth, sixth, seventh eighth, etc.

According to another embodiment, the present invention provides a process for controlling a plurality of plug load devices by a plurality of users. According to this process, from a plurality of remote user devices are received first communications. Upon receipt of these communications, the graphic user interface of the devices display options for changing the energy usage of appliances (also referred to as plug loads). Notably the options available on different devices may be different, depending on the authorization of the user to change energy usages.

After viewing options, a plurality of users may send instructions to alter the energy usage of one or more devices. When instructions come from a first and second user, they may for example be referred to as a first instruction and a second instruction. The actions on the plurality of devices may occur simultaneously or at different times. When conflicting instructions are received, the system may determine which instructions are entitled to override other instructions. The decision may be made by a computer processor due to rules that are stored in memory that is automatically accessible by the computer.

If there is no conflict, then the instructions may be transmitted to a system controller in a format that causes them to be executed. If there is a conflict either between instructions that are received at the same time or between an instruction that is in force and one that is received, a new data package may be formed that applies the aforementioned rules and that is different from one or more of the instructions received.

The instructions that are transmitted for execution may be referred to as a third instruction regardless of whether they contain an unaltered first instruction and an unaltered second instruction or whether they contain a set of instructions that omits part or all of the first or second instructions in order to be in compliance with the stored rules.

In some embodiments, the first user and the second user are each authorized to control energy usage of two overlapping but not coextensive sets of outlet control and monitoring devices. In other embodiments, they have permission to control non-overlapping sets of devices. In still other embodiments, the first user is authorized to control energy usage of a subset of the devices for which the second user is authorized to control energy usage.

Additionally, by way of example, the third instruction may comprise directions for a real-time change in electricity usage. Alternatively or additionally, the third instruction may comprises direction for a future change in electricity usage at a scheduled time, and the outlet control and monitoring devices may execute the command at a scheduled time. If the users are part of the same client, then as described above, a third instruction may be sent to the same system controller. However, if the users are associated with different clients, then the first instruction would be sent to a first system controller and the second instruction would be sent to a second system controller. The instructions that are sent to a system controller may be part of a weekly schedule message or part of a real time message depending on whether they are sent as part of a regular transmission of messages that contain information to change energy usage or part of a real time message.

Systems, Hardware and Software

The functions of the various elements described above and shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

The hardware and software for execution of various embodiments may be combined into systems for controlling energy usage of one or more plug load devices, and these systems may comprise one or more plug load devices themselves. The systems may also comprise one or more outlet control and monitoring devices. As noted above, the outlet control and monitoring device stores a compiled device power state schedule for a major scheduling period and is operably coupled to the plug load device. Furthermore, the outlet control and monitoring device may comprise an onboard memory device, wherein the onboard memory device stores the compiled device power state schedule, and the onboard memory device may be further configured to store historical energy usage data. Additionally, in some embodiments, the onboard memory device may also be configured to store a compiled device power state schedule for future control signal events. Also present within the outlet control and monitoring device may be a device operating system that is configured to cause a change in energy usage according to the compiled device power state schedule for future control signal events.

In some embodiments, the system also comprises a system controller and a system management node, which may be defined as they are in connection with the embodiments described above. Thus, the system management node may for example be configured to communicate with the system controller and comprises or is operably coupled to a first database that stores a plurality of energy savings plans, wherein each energy savings plan comprises information for a plurality of planned on/off events over a major scheduling period of duration T1, wherein the major scheduling period is divided into a plurality of minor scheduling periods, wherein the number of minor scheduling periods is n and each minor scheduling period is of duration T2 and wherein $T1=n \times T2$; (ii) a communication module, wherein the communication module is configured to receive digital information comprising (1) a selection of a plurality of energy savings plans, (2) a start date and an end date for each energy savings plan within the plurality of energy savings plans, (3) a designation of at least one plug load device to which to apply the set of energy savings plans within the plurality of energy savings plans, and (4) a prioritization of energy savings plans within the plurality of energy savings plans.

Additionally, in various embodiments, the system management node may also be configured to communicate with the system controller and comprises or is operably coupled to: (i) a computer program product for generating a compiled device power state schedule, wherein the compiled device power state schedule is dependent on the selection of the energy savings plan, the start date and the end date of the energy savings plans and the prioritization of the energy savings plans; and (ii) a transmission module, wherein the transmission module is configured to transmit the compiled device power state schedule to the system controller and the system controller is configured to store the complied device power state schedule and to transmit the compiled device power state schedule to the outlet control and management devices.

In some embodiments, the system management node is configured to receive a instructions from a plurality of control devices, for example, a first instruction from a first control device for processing and a second instruction from a second control device for processing. Additionally or alternatively, the system controller may be configured to store a plurality of compiled device power state schedules for a plurality of outlet control and monitoring devices.

In still further embodiments, the system controller may be configured to store a first compiled device power state schedule and a second compiled device power state schedule for the same outlet control and monitoring device and to transmit the second compiled device power state schedule to the outlet control and monitoring device only if the second compiled device power state schedule is different from the first compiled device power state schedule.

Other hardware, conventional and/or custom, may also be included. Similarly, any switches shown in the figures are conceptual only. Their functions may be carried out through the operation of program logic, through dedicated logic, through the interaction of program control and dedicated logic, or even manually, the particular technique being selectable by the implementer as more specifically understood from the context.

Unless specifically stated otherwise or apparent from context the disclosure provided herein, it is appreciated that throughout the specification discussions utilizing terms such as "processing," "computing," "calculating," "determining," or the like, refer to the action and/or processes of a computer or computing system, virtual machine (VM), or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, embodiments of the present invention may include apparatuses that are designed for performing the operations herein. An apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus. In some embodiments, the medium in which the computer program product is stored is a non-transitory medium.

Various general purpose systems may be used with programs in accordance with the teachings herein, or it may prove convenient to construct a more specialized apparatus to perform the desired method. In addition, embodiments of the present invention are not described with reference to any particular programming language. It is appreciated that a variety of programming languages maybe used to implement the teachings of the inventions as described herein.

In software implementations, computer software (e.g., programs or other instructions) and/or data may be stored on a machine readable medium as part of a computer program product, and is loaded into a computer system or virtual machine or other device or machine via a removable storage drive, hard drive, or communications interface. Computer programs (also called computer control logic or computer readable program code) may be stored in a main and/or secondary memory, and executed by one or more processors (controllers or the like) to cause the one or more processors to perform the functions of the invention as described herein. In this document, the terms "machine readable medium," "computer program medium" and "computer usable medium" are used to generally refer to media such as random access memory (RAM); a read only memory (ROM); a removable storage unit (e.g., a magnetic or optical disc, flash memory device, or the like); and a hard disk. In some embodiments, they are in non-transitory mediums and can transform both data, and when executed, the energy use of a device, thereby transforming the devices from an on state to an off state or from an off state to an on state.

Any of the features of specific various embodiments described herein can be used in conjunction with features of other embodiments disclosed herein unless otherwise specified. Thus, features described in connection with the various or specific embodiments are not to be construed as not suitable in connection with other embodiments disclosed herein unless such exclusivity is explicitly stated or implicit from context. Furthermore, section headings are provided for the convenience of the reader and should not be interpreted to limit the scope of the invention in any way.

We claim:

1. A method for generating a compiled device power state schedule, said method comprising:
   a. accessing a computer database that stores a set of energy savings plans, wherein each energy savings plan comprises information corresponding to a plurality of planned on/off events over a major scheduling period of duration T1, wherein the major scheduling period is divided into a plurality of minor scheduling periods, wherein the number of minor scheduling periods is n and each minor scheduling period is of duration T2 and wherein T1=n×T2, wherein each planned on/off event is a single on or off event that corresponds to the beginning of a period when energy is to be used by a device or when energy is not to be used by a device;
   b. associating one or more devices with a plurality of energy savings plans from said set of energy savings plans, wherein each energy savings plan has
      i. a start date and an end date, and
      ii. a priority value, wherein the priority value is a relative ranking of each energy savings plan; and
   c. applying a computer algorithm to the plurality of energy saving plans of (b) to generate an output, wherein the output comprises a compiled device power state schedule for a time period XY of duration T1 and the time period is divided into n minor scheduling periods, each of which has a duration T2, wherein the time period XY begins at X and ends at Y and for each minor scheduling period within XY the algorithm analyzes the plurality of energy savings plans to determine which energy savings plan that has a start date that is before or the same as the minor scheduling period within XY and an end date that is after or the same as the minor scheduling period within XY has the greatest priority for incorporation into the compiled device power state schedule.

2. The method according to claim 1, wherein the major scheduling period is one week, and the minor scheduling period is one day.

3. The method according to claim 2, wherein in step (b) for at least two energy savings plans the start dates or the end dates or both the start dates and the end dates differ.

4. The method according to claim 3, wherein within each of the energy savings plans in the database, each minor scheduling period is defined by reference to a day of the week and X and Y are each defined by a calendar date and time and in step (c) the algorithm analyzes at least three energy savings plans over the same minor scheduling period.

5. The method according to claim 1, wherein if the start date of an energy savings plan and the end date of an energy savings plan define a period greater than T1, then the algorithm deems the energy savings plan to repeat over the time period between the start date and the end date.

6. The method according to claim 1, wherein the output further comprises a designation of an outlet control and monitoring device for the compiled device power state schedule.

7. A method for controlling the energy usage of one or more plug load devices comprising:
   a. receiving electronic data comprising a first set of instructions, wherein the first set of instructions comprises
      i. an identification of a plurality of energy savings plans, wherein each energy savings plan comprises information for a plurality of planned on/off events over a major scheduling period of duration T1, wherein the major scheduling period is divided into a plurality of minor scheduling periods, wherein the number of minor scheduling periods is n and each minor scheduling period is of duration T2 and wherein T1=n×T2, wherein each planned on/off event is a single on or off event that corresponds to the beginning of a period when energy is to be used by a device or when energy is not to be used by a device and each planned on/off event occurs at the beginning of a minor scheduling period;
      ii. a start date and an end date for each energy savings plan;
      iii. a set of priority rules, wherein the priority rules define a relative order of priority among the plurality of energy savings plans that may be used to determine which planned on/off events from which energy savings plans to apply for each minor scheduling period; and
      iv. a designation of one or more plug load devices for each energy savings plan;
   b. generating a compiled device power state schedule, wherein the compiled device power state schedule comprises a second set of instructions, wherein the second set of instructions correspond to planned on/off events for a time period T1 to begin on date X and end on date Y, and said instructions are derived from the plurality of energy savings plans according to the start date and the end date for each energy savings plan and the priority rules, wherein at least two energy savings plans are associated with different start dates, different end dates or both different start states and different end dates;
   c. transmitting the compiled device power state schedule to a system controller;
   d. causing the system controller to store the compiled device power state schedule and to transmit it to one or more outlet control and monitoring devices, wherein each of said one or more outlet control and monitoring devices is associated with one or more plug load devices; and e. causing the one or more outlet control and monitoring devices to implement the compiled device power state schedule.

8. The method according to claim 7, wherein the compiled device power state schedule is obtained by applying an algorithm to the plurality of energy saving plans to generate an output, wherein the output is the compiled device power state schedule for a time period XY of duration T1 and the time period XY is divided into n minor scheduling periods of duration T2, and for each minor scheduling period within XY the algorithm analyzes the plurality of energy savings plans to determine which energy savings plan that has a start date that is before or the same as the minor scheduling period within XY and an end date that is after or the same as the minor scheduling period within XY has the greatest priority for incorporation into the compiled device power state schedule.

9. A method for controlling a plurality of plug load devices comprising the method of claim 8, wherein the system management node generates a plurality of compiled device power state schedules comprising a first compiled device power state schedule and a second compiled device power state schedule, wherein the first compiled device power state schedule provides instructions to be transmitted to a first outlet control and monitoring device and the second compiled device power state schedule provides instructions to be transmitted to a second outlet control and monitoring device.

10. The method of claim 9, wherein the first outlet control and monitoring device and the second outlet control and monitoring device are operably coupled to the same system controller.

11. The method according to claim 9, wherein the first compiled device power state schedule is transmitted to a first system controller and the second compiled device power state schedule is transmitted to a second system controller.

12. The method according to claim 9, wherein the instructions are received from a first user and a second user and the instructions from said first user and said second user identify a common plug load device and further wherein when generating the compiled device power state schedule, each priority rule of the first user takes precedent over each priority rule of the second user.

13. A system for controlling energy usage of a plug load device comprising:
a) a plug load device;
b) an outlet control and monitoring device, wherein the outlet control and monitoring device stores a compiled device power state schedule for a major scheduling period and is operably coupled to the plug load device;
c) a system controller, wherein the system controller is configured to communicate wirelessly with the outlet control and monitoring device;
d) a system management node, wherein the system management node is configured to communicate with the system controller and comprises or is operably coupled to
  i. a first database that stores a plurality of energy savings plans, wherein each energy savings plan comprises information for a plurality of planned on/off events over a major scheduling period of duration T1, wherein the major scheduling period is divided into a plurality of minor scheduling periods, wherein the number of minor scheduling periods is n and each minor scheduling period is of duration T2 and wherein T1=n×T2, wherein each planned on/off event is a single on or off event period that corresponds to the beginning of a period when energy is to be used by a device or when energy is not to be used by a device and each planned on/off event occurs at the beginning of a minor scheduling period;
  ii. a communication module, wherein the communication module is configured to receive digital information comprising
    1. a selection of a plurality of energy savings plans, wherein each energy savings plan is associated with a start date and an end date and a prioritization wherein at least two energy savings plans are associated with different start dates, different end dates or both different start states and different end dates, and
    2. a designation of at least one plug load device to which to apply the set of energy savings plans within the plurality of energy savings plans, and
  iii. a computer program product for generating a compiled device power state schedule, wherein the compiled device power state schedule is dependent on the selection of the energy savings plans, the start date and the end date for each energy savings plan within the plurality of energy savings plans and the prioritization of each energy savings plans within the plurality of energy savings plans; and
  iv. a transmission module, wherein the transmission module is configured to transmit the compiled device power state schedule to the system controller and the system controller is configured to store the compiled device power state schedule and to transmit the compiled device power state schedule to the outlet control and management device.

14. The system of claim 13, wherein the outlet control and monitoring device comprises an onboard memory device, wherein the onboard memory device stores the compiled device power state schedule.

15. The system of claim 14, wherein the onboard memory device is further configured to store historical energy usage data.

16. The system of claim 15, wherein the onboard memory device is configured to store a compiled device power state schedule for future control signal events and the outlet control and monitoring device comprises a device operating system that is configured to cause a change in energy usage according to the compiled device power state schedule for future control signal events.

17. The system of claim 13, wherein the system management node is configured to receive a first instruction from a first control device for processing and a second instruction from a second control device for processing.

18. The system of claim 13, wherein the system controller is configured to store a plurality of compiled device power state schedules for a plurality of outlet control and monitoring devices.

19. The system of claim 13, wherein the system controller is configured to store a first compiled device power state schedule and a second compiled device power state schedule for the outlet control and monitoring device and to transmit the second compiled device power state schedule to the outlet control and monitoring device only if the second compiled device power state schedule is different from the first compiled device power state schedule.

20. The system of claim 13, wherein the plug load device is a first plug load device, and the system further comprises a second plug load device, wherein the second plug load device is operably coupled to the system controller.

* * * * *